(12) United States Patent
Taggart

(10) Patent No.: US 11,390,151 B1
(45) Date of Patent: Jul. 19, 2022

(54) VEHICLE TOP AND METHOD OF USE

(71) Applicant: Charles Lee Taggart, Southlake, TX (US)

(72) Inventor: Charles Lee Taggart, Southlake, TX (US)

( * ) Notice: Subject to any disclaimer, the term of this patent is extended or adjusted under 35 U.S.C. 154(b) by 0 days.

(21) Appl. No.: 16/822,627

(22) Filed: Mar. 18, 2020

(51) Int. Cl.
*B60J 7/16* (2006.01)

(52) U.S. Cl.
CPC .................. *B60J 7/1635* (2013.01)

(58) Field of Classification Search
CPC ....... B60J 7/12; B60J 7/14; B60J 7/143; B60J 7/146; B60J 7/148; B60J 7/1635
USPC .............. 296/108, 107.7, 220.01, 100.09
See application file for complete search history.

(56) References Cited

U.S. PATENT DOCUMENTS

| | | | | |
|---|---|---|---|---|
| 2,086,091 | A * | 7/1937 | Payette .................... | B60J 7/041 296/100.09 |
| 3,977,720 | A * | 8/1976 | Schreiberg ................ | B60P 3/07 296/185.1 |
| 7,722,103 | B2 * | 5/2010 | Brandel ................... | B60J 7/028 296/26.02 |
| 10,538,152 | B1 * | 1/2020 | Singer .................... | B60J 7/1856 |
| 10,843,543 | B2 * | 11/2020 | Haimerl ................... | B60J 7/061 |
| 2001/0019213 | A1 * | 9/2001 | Eberle ..................... | B60J 7/145 296/108 |
| 2002/0084678 | A1 * | 7/2002 | Schutt ..................... | B60J 7/148 296/220.01 |
| 2004/0007897 | A1 * | 1/2004 | Hasselgruber ........... | B60J 7/145 296/108 |
| 2005/0012357 | A1 * | 1/2005 | Miller ..................... | B60J 7/04 296/107.17 |
| 2005/0017548 | A1 * | 1/2005 | Rudolph .................. | B60J 7/04 296/218 |
| 2005/0134096 | A1 * | 6/2005 | Fallis, III ................ | B60J 7/10 296/218 |
| 2008/0315632 | A1 * | 12/2008 | Righetti ................... | B60J 7/04 296/217 |
| 2009/0102246 | A1 * | 4/2009 | Dorin ...................... | B60J 7/047 296/220.01 |
| 2016/0031302 | A1 * | 2/2016 | Nania ...................... | B60P 7/02 296/100.09 |
| 2019/0001798 | A1 * | 1/2019 | Sviberg ................... | B60J 7/146 |
| 2019/0001799 | A1 * | 1/2019 | Sviberg ................... | B60J 7/061 |
| 2019/0176597 | A1 * | 6/2019 | Haimerl .................. | B60J 7/146 |

FOREIGN PATENT DOCUMENTS

| | | | | |
|---|---|---|---|---|
| DE | 10335032 | * | 2/2005 | |
| DE | 102006028548 | A1 * | 12/2007 | |
| DE | 102008021508 | A1 * | 4/2008 | |
| EP | 0857597 | A1 * | 1/1998 | |
| EP | 1352768 | A2 * | 10/2003 | ............. B60J 7/028 |
| EP | 1972479 | A1 * | 9/2008 | ............. B60J 7/143 |

* cited by examiner

*Primary Examiner* — D Glenn Dayoan
*Assistant Examiner* — Kevin P Weldon
(74) *Attorney, Agent, or Firm* — Leavitt Eldredge Law Firm

(57) ABSTRACT

A vehicle hardtop system for a jeep-type sports utility vehicle, which includes a roof panel having segments, the segments each connected to one another via hinges, the segments fold onto one another and then onto a rear panel such that the entire roof panel and rear panel is removable from the vehicle hard top.

1 Claim, 8 Drawing Sheets

VEHICLE TOP AND METHOD OF USE

BACKGROUND

1. Field of the Invention

The present invention relates generally to vehicle hardtop systems, and more specifically to a hardtop system suitable for jeep-type sport utilities vehicles.

2. Description of Related Art

Vehicle convertible top systems are well known in the art and are effective means of enhancing the performance of the vehicle as well as providing enjoyment to a user. In general, vehicle convertible top systems are made of either a hardtop, soft top, or a combination thereof. Typically, soft tops are easier to configure onto a vehicle but are less durable than hardtops. Additionally, hardtops add more insulation to the vehicle and decrease road noise during use.

One of the problems commonly associated with conventional vehicle hardtop systems is limited feasibility. For example, hardtops are difficult to assemble and remove by a single person. Hardtops are also typically disassembled into segments which are then stored inside either the vehicle itself or some other structure (e.g., garage). This takes up cargo space within the vehicle or inhibits the user from being able to access the hardtop segments more readily.

Accordingly, although great strides have been made in the area of vehicle hardtop systems, many shortcomings remain.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

Figure 1A:
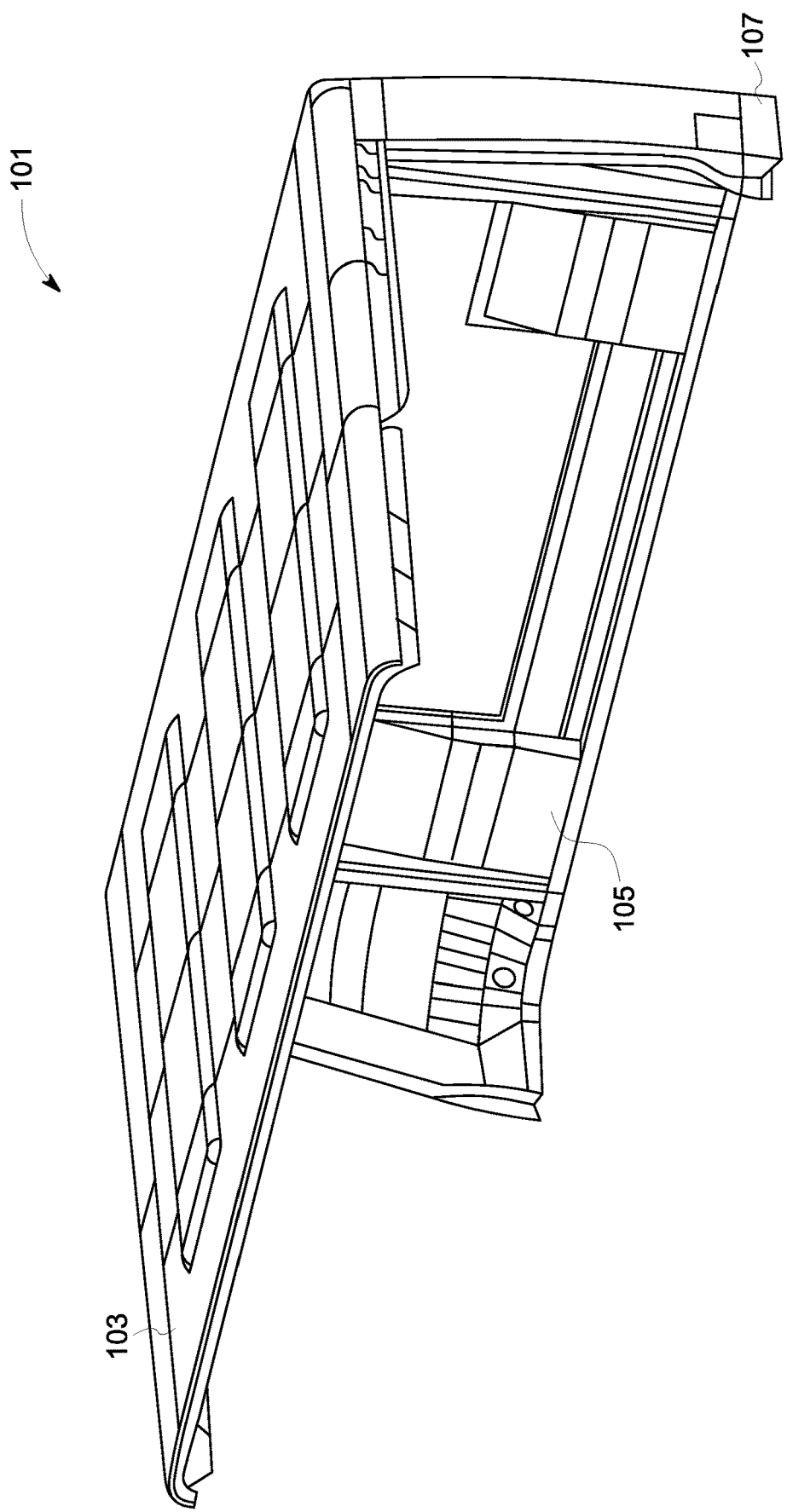
FIG. 1A is a front perspective view of a preferred embodiment of the vehicle hardtop system of the present application.

While the system and method of use of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the system and method of use of the present application are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system and method of use in accordance with the present application overcomes one or more of the above-discussed problems commonly associated with conventional vehicle hardtop systems. Specifically, the system of the present invention allows easy removability of the roof and back panels of a vehicle hardtop. These and other unique features of the system and method of use are discussed below and illustrated in the accompanying drawings.

The system and method of use will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

The preferred embodiment herein described is not intended to be exhaustive or to limit the invention to the precise form disclosed. It is chosen and described to explain the principles of the invention and its application and practical use to enable others skilled in the art to follow its teachings.

Figure 1B:
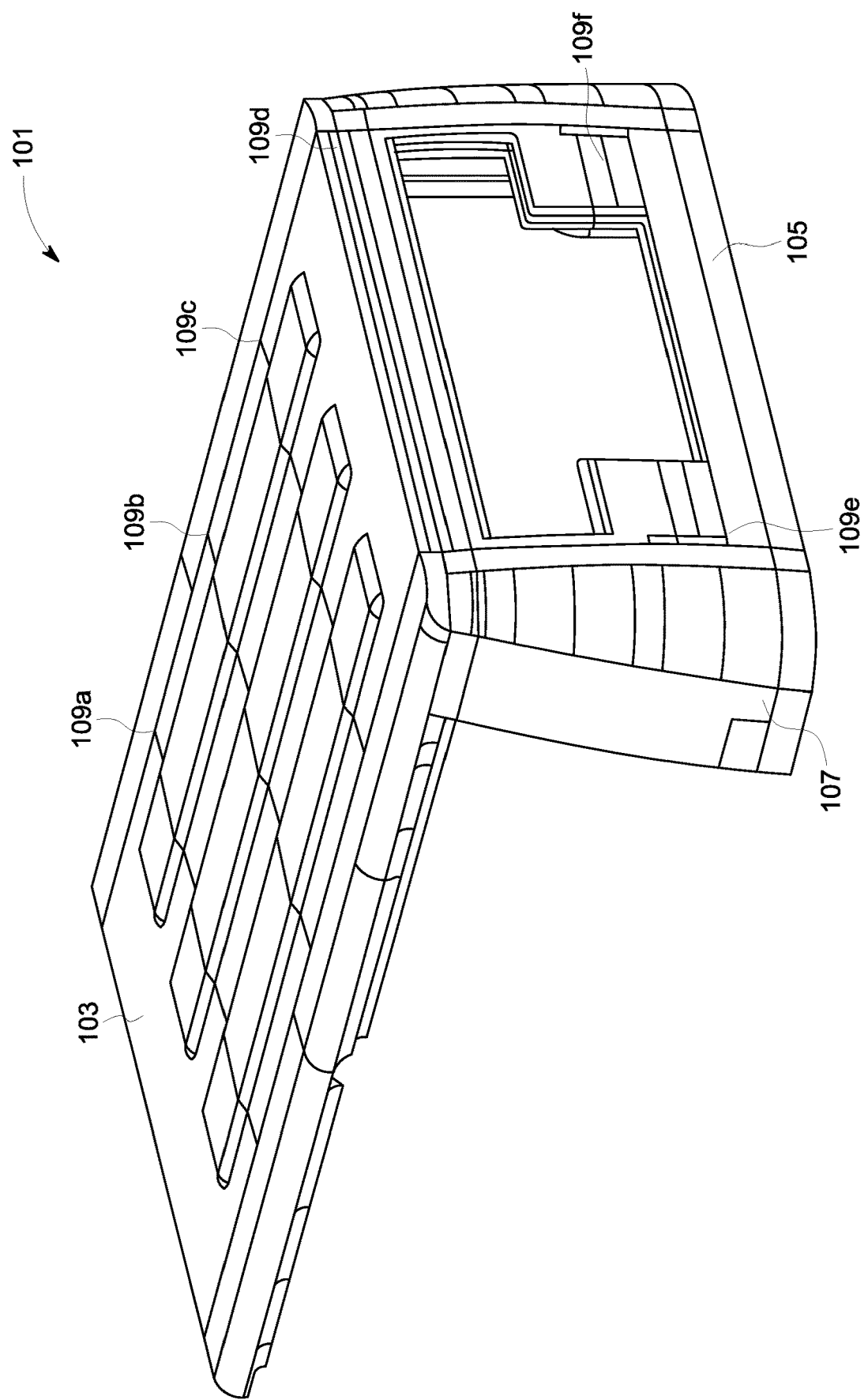
FIG. 1B is a rear perspective view of a preferred embodiment of the vehicle hardtop system.

Referring now to the drawings wherein like reference characters identify corresponding or similar elements throughout the several views, FIGS. 1A-1B depict a front perspective view and a rear perspective view of a vehicle hardtop system suitable for jeep-type sports utilities vehicles in accordance with a preferred embodiment of the present application. It will be appreciated that system 101 overcomes one or more of the above-listed problems commonly associated with conventional vehicle hardtop systems.

In the contemplated embodiment, system 101 includes a roof panel 103, a rear panel 105, a pair of opposing side panels 107, and a plurality of hinges 109a, 109b, 109c, 109d, 109e, and 109f. The roof panel 103 and the rear panel 105 are divided into a plurality of segments via the hinges 109 and are in communication via the hinges 109.

It is contemplated and will be appreciated that system 101 incorporates high strength metal, fiberglass, rubber, composite materials, other suitable material, or a combination thereof.

It is also contemplated and will be appreciated that system 101 can include a plurality of sealants of suitable material to prevent environmental elements from leaking into the frame of system 101. For example, system 101 may include a sealing gasket along roof panel 103 and side panel 105.

It is further contemplated and will be appreciated that hinges 109 allows the plurality of segments to fold into a collapsible manner.

It should also be appreciated that one of the unique features believed characteristic of the present application is that it allows for feasible movement of the vehicle hardtop system 101 by a single person.

Figure 2A:
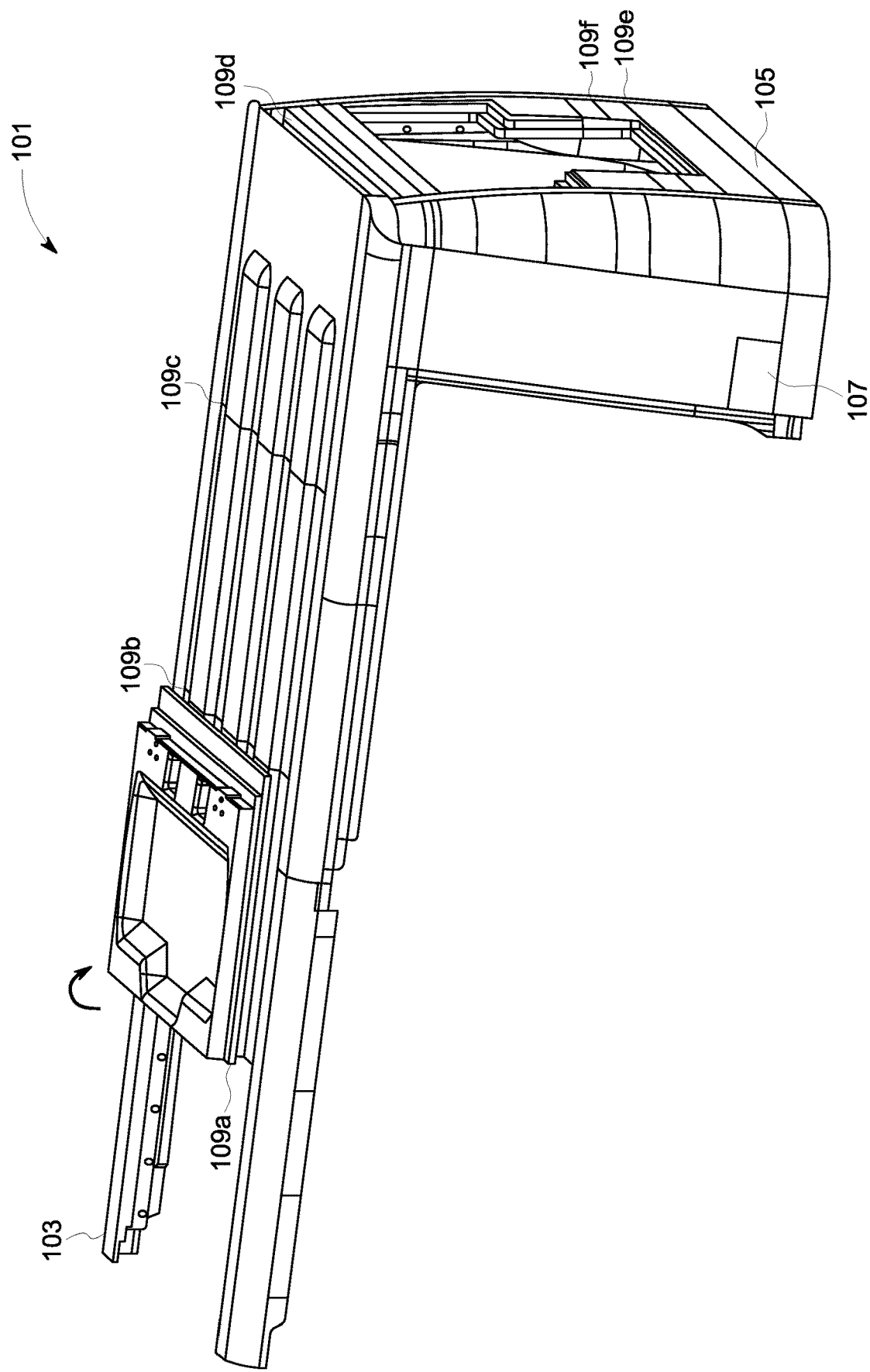
FIG. 2A is a perspective view of a preferred embodiment of the vehicle hardtop system, illustrating the first foldable segment of the roof panel.
Figure 2B:
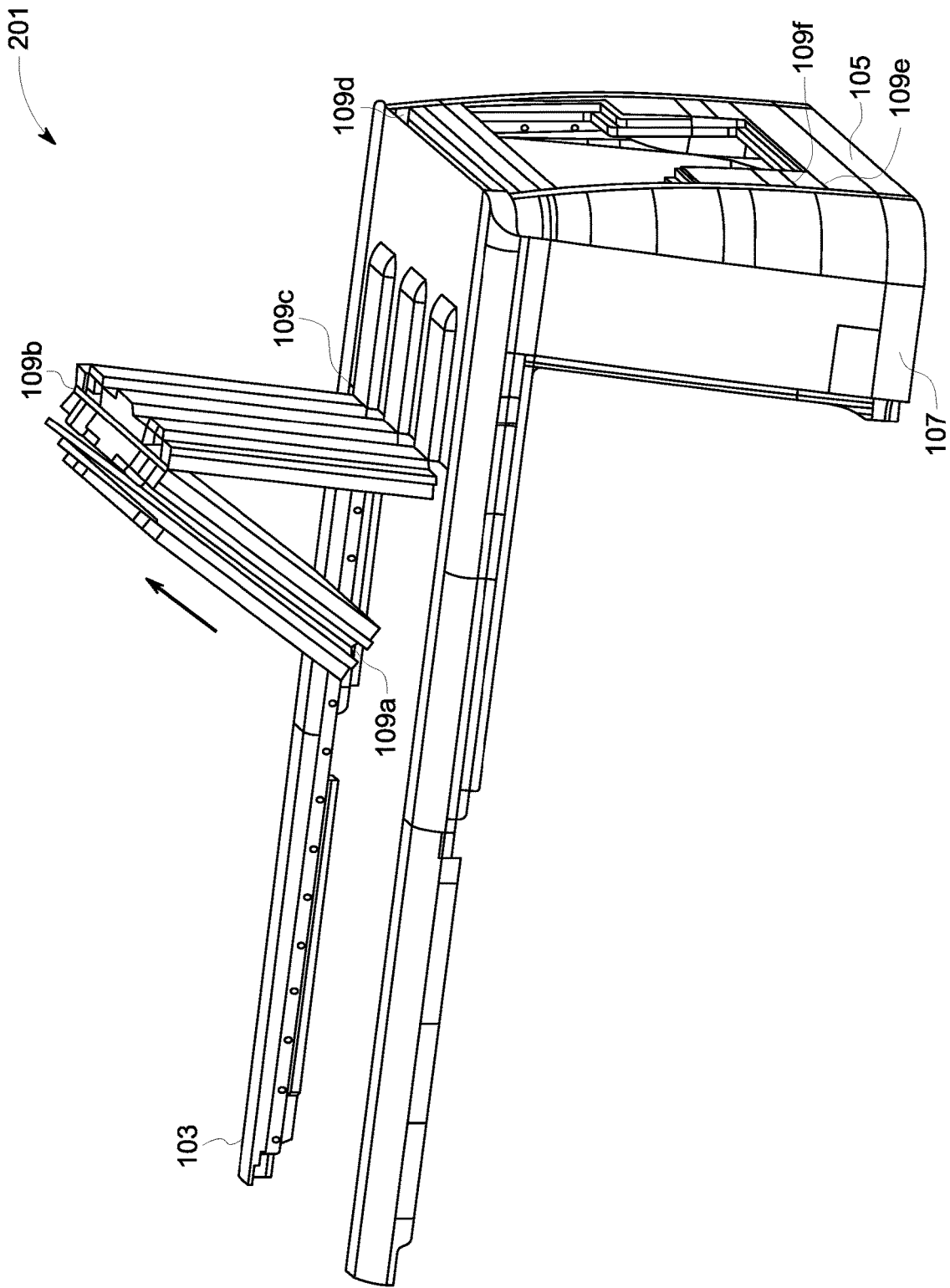
FIG. 2B is a perspective view of a preferred embodiment of the vehicle hardtop system, illustrating the second foldable segment of the roof panel.
Figure 2C:
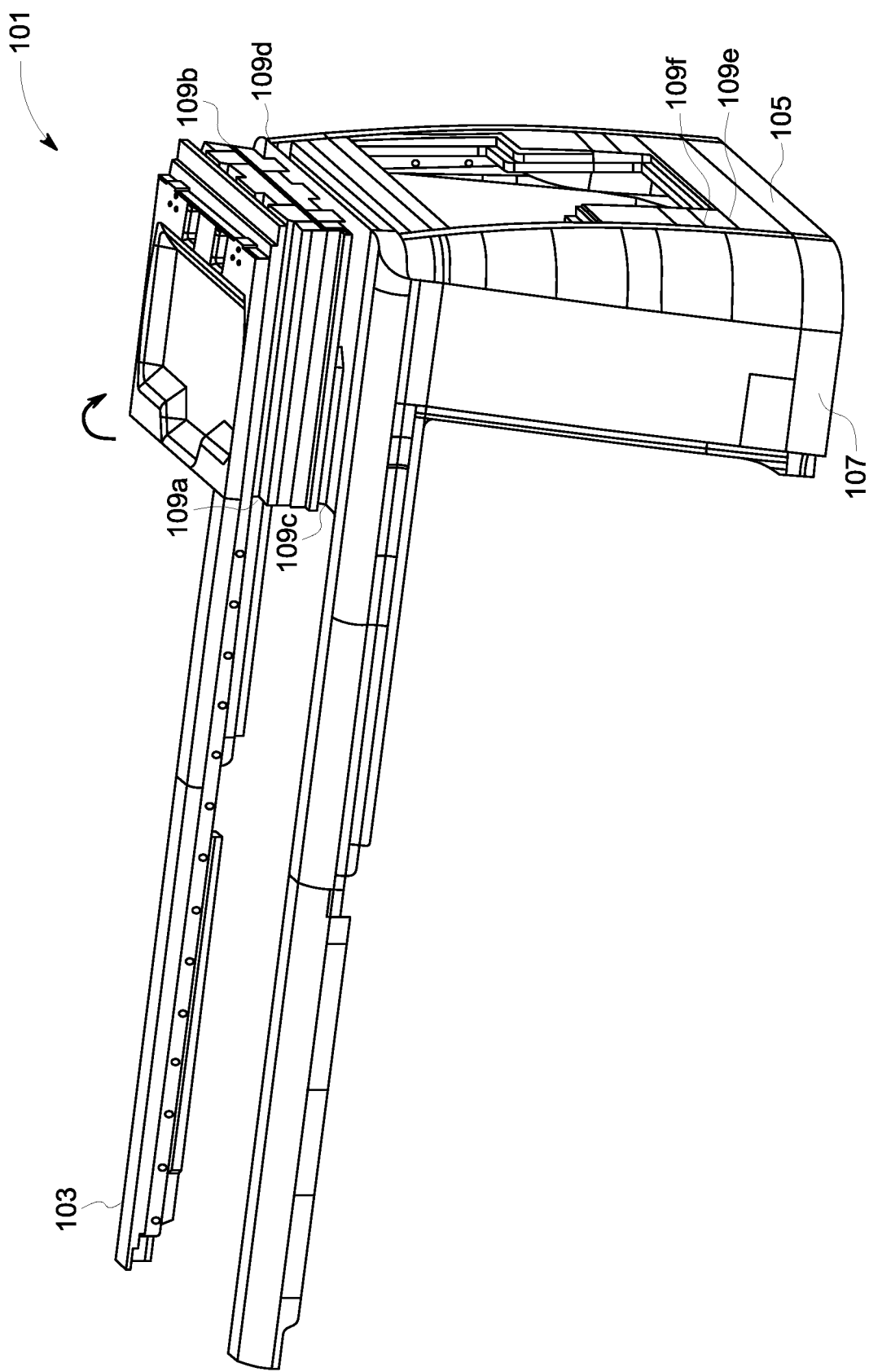
FIG. 2C is a perspective view of a preferred embodiment of the vehicle hardtop system, illustrating the third foldable segment of the roof panel.

Referring now to FIGS. 2A, 2B, 2C, the folding of the roof segments is shown. Each roof segment is moved back towards the rear panel 105 via hinges 109*a*, 109*b*, and 109*c* as indicated by the directional arrows.

Figure 2D:
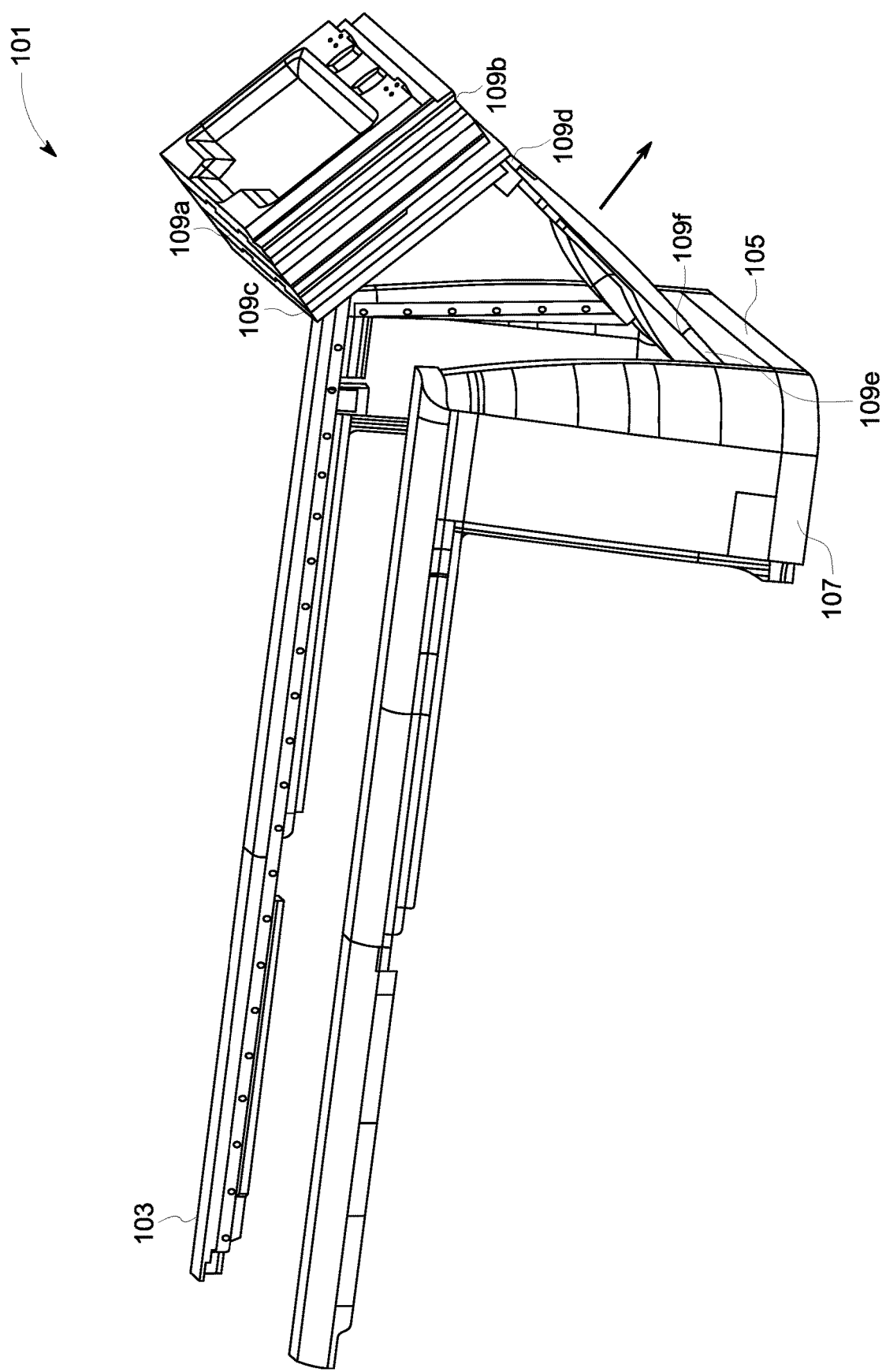
FIG. 2D is a perspective view of a preferred embodiment of the vehicle hardtop system, illustrating the first foldable segment of the rear panel.
Figure 2E:
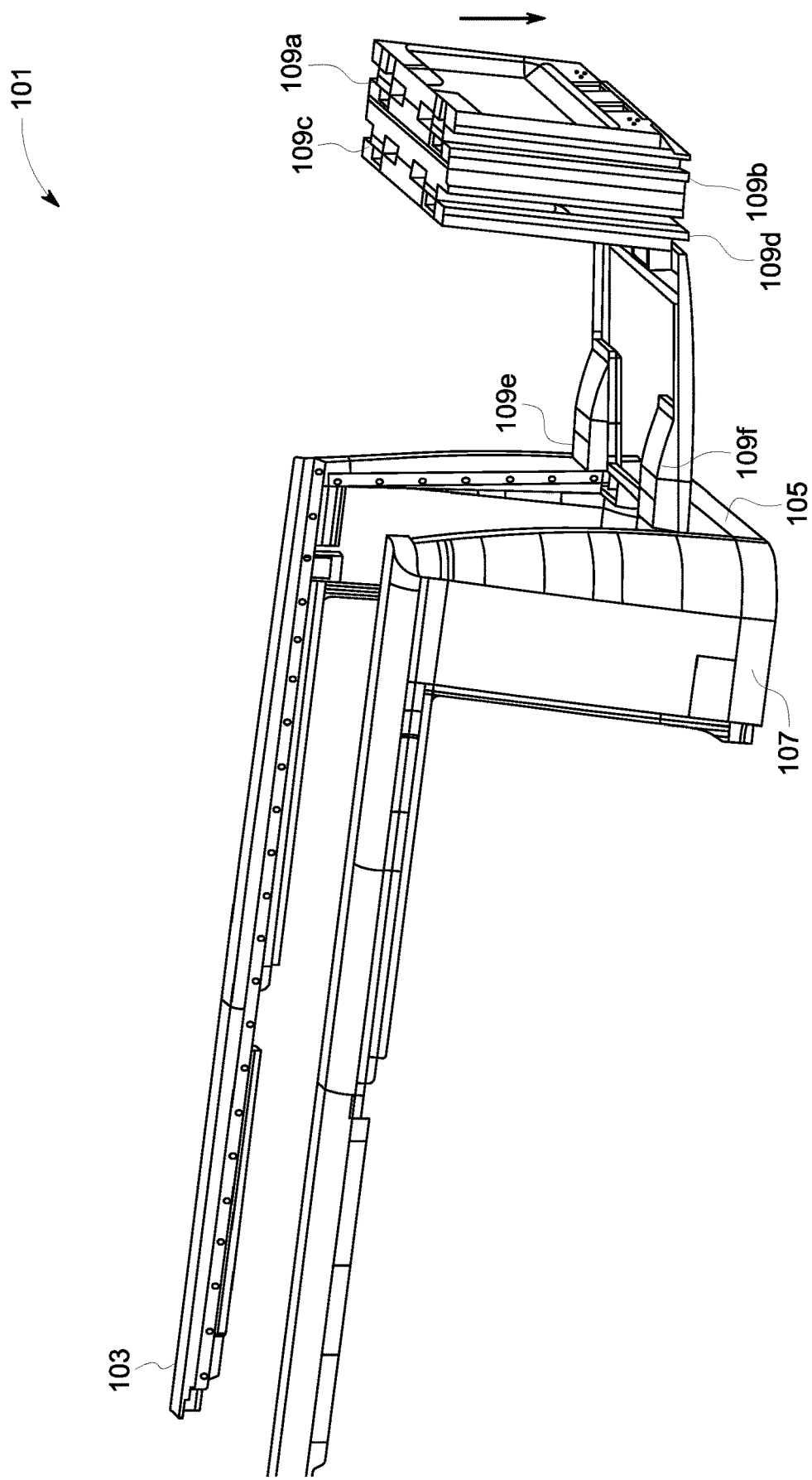
FIG. 2E is a perspective view of a preferred embodiment of the vehicle hardtop system, illustrating the second foldable segment of the rear panel.
Figure 2F:
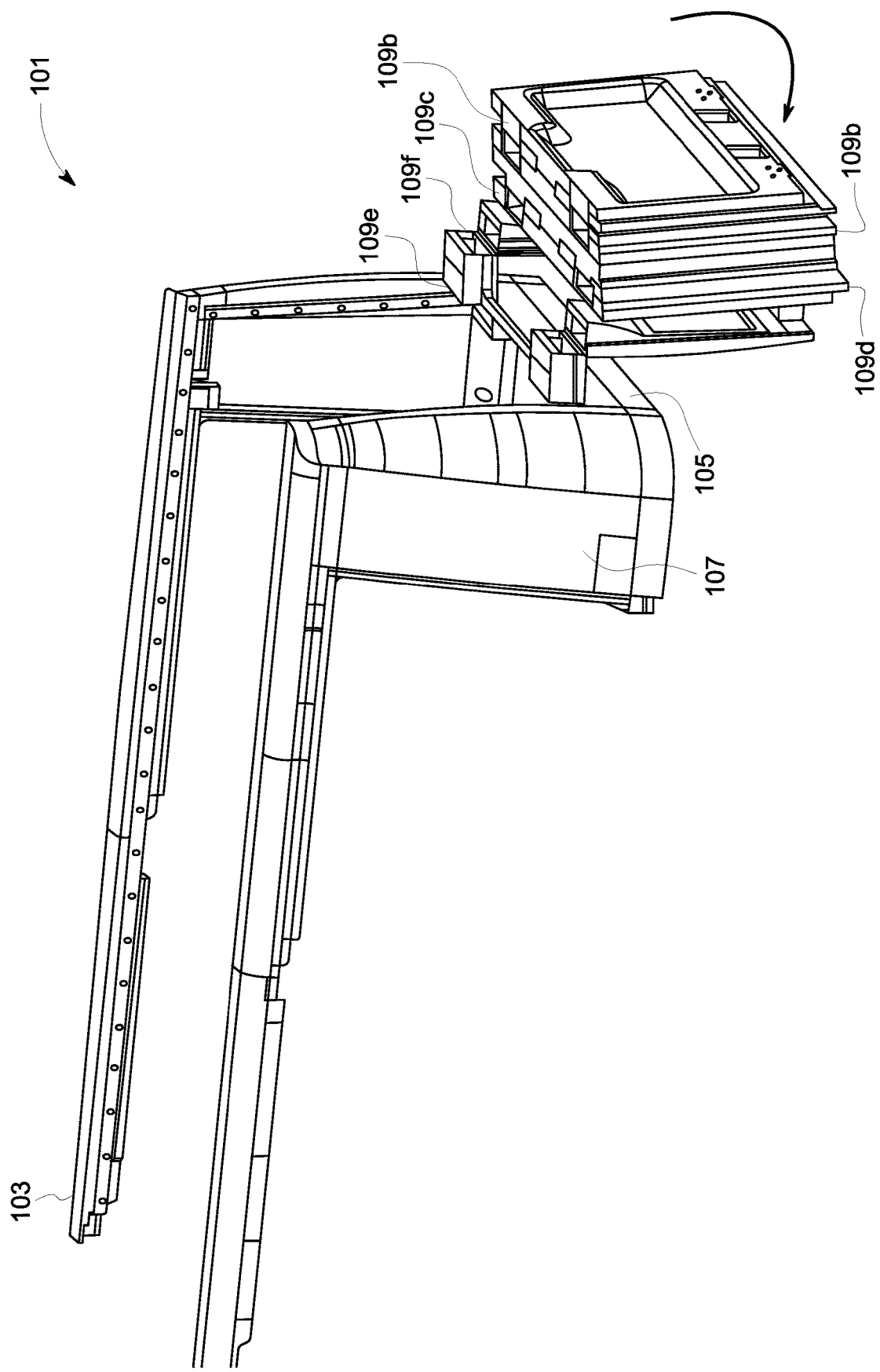
FIG. 2F is a perspective view of a preferred embodiment of the vehicle hardtop system, illustrating the third foldable segment of the rear panel.

FIGS. 2D, 2E, and 2F, the folding of the rear segments is shown. Hinges 109*d* and 109*e* allow the rear segments to move downward with hinge 109*f* folding the rear segments back toward the frame of the rear panel 105 as indicated by the directional arrows.

The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. A vehicle hardtop system, comprising:
  a roof panel, having:
    a plurality of segments, the plurality of segments are connected solely by a plurality of hinges and fold relative to each other via the plurality of hinges;
  a pair of side panels, the pair of side panels extending perpendicular to each other and forming an opening therebetween;
  wherein the plurality of segments cover an entire area of the opening;
  a rear panel having an opening and positioned perpendicular to the plurality of segments, the rear panel extends from a first end to a second end, the first end is pivotally attached to the plurality of segments via a first rear panel hinge and pivotally attached to a side panel via a second rear panel hinge; and
  wherein the plurality of segments fold onto each other via the plurality of hinges;
  wherein the plurality of segments fold onto the rear panel; and
  wherein the roof panel and the rear panel extend between and engage with the pair of side panels.

* * * * *